United States Patent [19]

Harris

[11] Patent Number: 4,721,589
[45] Date of Patent: Jan. 26, 1988

[54] EXTRUDER VISCOSITY CONTROL SYSTEM AND METHOD

[75] Inventor: Holton E. Harris, Westport, Conn.

[73] Assignee: Harrel, Inc., East Norwalk, Conn.

[21] Appl. No.: 534,641

[22] Filed: Sep. 22, 1983

[51] Int. Cl.[4] .............................................. B29B 7/72
[52] U.S. Cl. ................................. 264/40.1; 264/40.6; 264/40.7; 425/143; 425/145
[58] Field of Search .................. 264/40.6, 40.7, 40.1, 264/349, 211.21; 425/145, 149, 144, 143, 161, 162, 376 B, 376 A; 137/92; 366/76, 143, 146, 132

[56] References Cited

U.S. PATENT DOCUMENTS

| | | | |
|---|---|---|---|
| 3,524,221 | 8/1970 | Jones, Jr. | 264/40.7 |
| 3,718,414 | 2/1973 | Jones, Jr. | 264/40.1 |
| 3,924,840 | 12/1975 | Nelson, Jr. | 264/40.6 |
| 4,102,958 | 7/1978 | Wertz | 264/40.6 |
| 4,137,023 | 1/1979 | Moked et al. | 418/202 |
| 4,171,193 | 10/1979 | Rahlfs | 264/40.7 |
| 4,209,476 | 6/1980 | Harris | 425/140 |
| 4,272,466 | 6/1981 | Harris | 264/40.6 |
| 4,290,986 | 9/1984 | Koschmann | 264/40.6 |
| 4,448,736 | 5/1984 | Emery et al. | 264/211 |
| 4,478,775 | 10/1984 | Endo et al. | 264/40.1 |

OTHER PUBLICATIONS

Penn, W. S., *Injection Moulding of Elastomers*, 1969, pp. 122–125.
Brydson, J. A., Flow Properties of Polymer Melts, 1970, pp. 47–62.
Harris, *Modern Plastics Encyclopedia*, 1981–82, "Extrusion Controls and Instrumentation", pp. 260–266.

*Primary Examiner*—Jay H. Woo
*Assistant Examiner*—J. Fortenberry
*Attorney, Agent, or Firm*—Brumbaugh, Graves, Donohue & Raymond

[57] ABSTRACT

An extruder control system and method controls melt temperature to maintain viscosity of the melt at the die. A constant volumetric flow to the die is delivered by a gear pump, the die is a fixed orifice, and pressure between the gear pump and the die is indicative of viscosity. Changes in pressure are sensed and compensating changes in temperature are effected to return the pressure and, hence, the viscosity to its previous value.

26 Claims, 4 Drawing Figures

EXTRUDER VISCOSITY CONTROL SYSTEM AND METHOD

BACKGROUND OF THE INVENTION

This invention relates to an apparatus and method for control of extrusion of a plastic stock material, and more particularly to an apparatus and method of extrusion control providing improved extrusion shape uniformity through the control of viscosity.

As is well known in the industry, a plastic extruder is frequently used to process plastic whenever one dimension is continuous, for example garden hose, plastic rod, plastic sheet, film, etc. A plastic extruder consists of a hollow, heated metal barrel with a screw turning inside of it such that plastic pellets or powder fed into one end of the barrel are melted, mixed and conveyed to the other end. By the time the plastic reaches the output end, considerable pressure has been built up, so that molten plastic, called melt, can be forced through a die which shapes it in two dimensions. Extrusion is continuous, and therefore the length dimension is continuous, as in the previous cited example of garden hose, rod, sheet, film, etc.

The barrel of the extruder is divided into a number of zones, usually 3 to 6. The pitch and depth of the screw varies in these zones so that the different functions of conveying the plastic pellets (or powder), melting the plastic, conveying the plastic in the melt, mixing thoroughly, homogenizing the temperature, and building up the pressure for the die can be accomplished most expediously. To accomplish their individual functions best, the zones are each held at a particular temperature which is dictated by the design of the screw. Each zone has an individual temperature altering means in the form of a heater or combined heater and cooler clamped to the outside of the barrel and one (or in some cases two) temperature sensors connected to a temperature controller whose function it is to control the temperature of each individual zone at the value dictated by the screw design, in spite of any changes that may occur in the frictional heat generated by the rubbing of the plastic against the barrel and the screw.

It should be noted that in such an extruder as this, most of the heat required to raise the temperature of the plastic to the melting point, to melt it, and then to raise the temperature of the melt to the temperature at which it is desired to force it through the die, comes from the frictional heat generated by the motion of the screw as it is driven by the motor. The temperature altering means clamped to the outside of the barrel are necessary to make up for the fact that the temperature of each individual zone might not be at the desired value for that zone if frictional heat alone were used. Therefore heat is added or subtracted at the individual zones to bring the temperature of each zone precisely to the desired point.

It is not only the temperature of the plastic at each of the zones of the screw that is of importance. For after the plastic leaves the screw, it is to be forced through a die to form the desired shape of the final product. The various properties of the plastic as it reaches the die are of major importance in determining the quantity and quality of the extrudate.

Pressure at the die is one of the most important factors. For, other things being equal, the higher the pressure at the die, the more plastic will be forced through, and the more product will be produced in any given time.

It is desirable to have a constant rate of extrusion, in order that the cross-sectional dimensions of the extrudate will be constant along its length. Process controllers which maintain the pressure at the die constant are thus in common use. One such is the Harrel CP-660 panel mount Digipanel system, commercially available and described in the technical data sheet TDS-251 of Harrel, Incorporated. These controllers sense the pressure at the die and adjust the speed of the screw in such a way as to hold the pressure constant. When such a pressure controller changes the speed of the screw, the frictional heat generated by the screw will change, and this will in turn change the temperature at each of the barrel zones described above. However, each of these zones has associated with it individual temperature control, and this control acts to bring the zone back to its setpoint, which is the preset desired value of temperature. This inventor's U.S. Pat. No. 4,272,466 describes controllers that control the temperature in the individual zones.

Another quality of the plastic melt at the die which is of importance is the temperature. Temperature at the die is important for two reasons. First, many plastics degrade, and this degradation will increase with increasing temperature. For such materials as polyvinyl chloride, it is important that the temperature of the melt be held as low as possible to minimize degradation of the plastic. The second reason that temperature at the die is of consequence is that it affects viscosity. For most materials, the higher the temperature the lower the viscosity, and hence the more that will be forced through the die per unit time at a given die pressure.

Melt temperature process controls are in common use, again as described in the aforementioned technical data sheet and throughout the literature. These measure the melt temperature at or near the die by means of a temperature probe actually inserted into the melt stream downstream of the screw. The melt temperature control then adjusts the setpoint values of the barrel zone temperatures up or down as required to hold the melt temperature constant. If the characteristic of the plastic and of the rest of the extrusion process remain the same, holding the temperature of the plastic at the die constant will hold the viscosity of the plastic constant. If the die pressure is also held constant, constant viscosity will also mean constant throughput and hence constant dimensions of the product in the length dimension.

Melt temperature control is useful, but unfortunately, holding the temperature at the die constant does not always hold the viscosity constant there. Temperature does most certainly affect viscosity, but so do many other factors, e.g. the melt index of the plastic, the degree to which it is agitated, the molecular weight, etc. The most common variation in the relationship between temperature and viscosity is due to the use of regrind material. Whenever plastic is extruded, some scrap is inevitable, for example, because of off-tolerance operation, or product wasted during start up and shutdown. It is customary to grind up this scrap and put it back in the hopper to reuse it. Sometimes plastic may actually go through the extruder three of four times in this manner.

In many plastics the physical properties are significantly changed once it has gone through the extruder. The physical properties are simply not the same between regrind and virgin plastic, and one of the most significant changes is in the viscosity which results from a given set of processing conditions. This means that the combination of a melt pressure controller and a melt temperature controller will not result in constant throughput and hence extrudate dimensions if the plastic is changed from virgin material to a blend of virgin material and regrind or to pure regrind, for example.

The problem of variation in throughput with varying melt viscosity can be solved by the use of a gear pump operating in tandem with the extruder as described in the current inventor's U.S. Pat. No. 4,209,476. A gear pump has closely meshed, counter-revolving gears in a close fitting housing. If material is introduced into one side of this set of gears, the amount of plastic that is transmitted to the other side as the gears are turned can be made to be virtually independent of the viscosity and dependent almost exclusively on the speed that the gears are turned and the volume of the gear teeth.

Stabilizing throughput with a gear pump is a tremendous advance, but as so often happens, when one improvement is made the desirability of another appears. Use of the gear pump has compensated for one effect of varying melt viscosity, i.e. the variations in throughput that it causes. It has not, however, eliminated the variations in viscosity itself. As the ratio of virgin material to regrind is changed, for example, we will still get the same quantity of plastic through the die, but the viscosity of the extrudate as it exits will be different. This difference in extrudate viscosity is very undesirable. For the shape of the extrudate can be affected markedly by the viscosity as the plastic enters the water bath or other cooling means upon leaving the extruder. It is particularly undesirable where post-extrusion forming operations are to be performed, as in blow molding or blown film. It would be very desirable if not only the throughput, but also the viscosity of the melt could be stabilized. It is the purpose of the present inventions to do this.

SUMMARY OF THE INVENTION

In accordance with the present invention, the viscosity of the melt near the die in a plastics extruder is determined and one or more process variables are controlled to maintain the appropriate viscosity. More particularly, in a preferred embodiment of the invention, a gear pump is provided preceding the die, the gear pump and die serve as a viscosity meter. Because the die orifice is fixed and the gear pump passes a given quantity of mix per unit time, the pressure of the melt between the gear pump and the die will be a function of viscosity. A change in pressure, indicative of a change in viscosity, is used to alter temperature of the melt and hence restore the viscosity to its original value.

The first step in successful viscosity control is measuring the viscosity. Measuring viscosity in a separate machine is not too difficult, and viscosity measuring devices, such as the Mooney machine and similar devices, are available. However, these machines will not measure plastic viscosity when the plastic is actually in the extruder. On line measurement of viscosity has long been one of the classic problems in extrusion. At least one attempt was made to measure viscosity on line by measuring the transmission in the plastic of an ultrasonic wave.

By one definition viscosity can be characterized as the amount of fluid per unit time that passes through a given orifice under a given pressure. It is therefore equally possible to characterize it by the amount of pressure that is generated when one passes a given volume per unit time through that same orifice. Bearing this in mind, it can be seen that one has all the elements at hand in the tandem extruder and gear pump combination to make the determination of viscosity. The die constitutes a fixed orifice, the gear pump assures a constant volume per unit time, and measuring the pressure can be accomplished by means of a conventional melt pressure sensor placed in the melt stream ahead of the die. Specifically, if a control assures that the pressure at the die remains constant for a constant throughput from the pump, under varying plastic composition, then that control has held the viscosity constant. Putting it another way, to hold the viscosity constant, one must change something in the extrusion process in such a manner as to prevent the changes in melt pressure at the die with constant throughput, which changes would otherwise occur when, for example, the properties of the plastic are changed, as by changing the virgin to regrind ratio.

The preferred embodiment of the present invention accomplishes the foregoing viscosity control by changing the temperature of the melt. Heat in barrel zones upstream of the gear pump and die is controlled to maintain viscosity at the die. The pressure between a gear pump and the die is sensed and this is used to modify upstream temperature control zones. This can be done by a melt pressure controller in cascade relation to upstream zone temperature controllers, and in a preferred arrangement the system and method use a conventional melt temperature cascade controller. However, instead of holding the melt temperature constant, as in conventional melt control, this system and method deliberately vary this temperature when necessary. In each case, temperature variation is done by a separate melt pressure controller operating in a cascade loop. The separate controller can be an individual discrete controller, or that part of a microprocessor based multi-loop controller assigned this task. This melt pressure controller senses the pressure before the die using a conventional melt pressure sensor. If some property of the plastic changes so that the viscosity begins to change, the melt pressure will change as described above. The controller will then go back and adjust the setpoint of the individual zones, or of the melt temperature controller, up or down as required to bring the melt pressure, and hence the viscosity, back to its correct value.

Using a conventional melt controller as part of this system amounts to using that controller in a very different manner from its conventional use. The conventional melt controller holds the melt temperature constant. As the properties of the plastic change, the viscosity of the plastic will change even if it is held at a constant temperature, for temperature is only one of the factors that govern viscosity. If other properties change, one must change the temperature to compensate and keep the viscosity constant. This is what the present invention does. If one extruder is running virgin material, for example, and this material is suddenly changed to part regrind, the viscosity at a given melt temperature will tend to drop. The controller described here will then move the setpoint of the melt temperature controller downwards until the viscosity gets back to is initial point. In this way the desired viscosity has been maintained.

In one preferred embodiment, barrel zone temperatures and melt temperature are controlled by the temperature control loops in a microprocessor based extrusion control such as the Harrel CP-660 unit as described in the aforementioned technical data sheet. The melt pressure is sensed in the normal manner by this controller, and a separate cascade process loop contained in it adjusts the setpoint of the melt temperature loop so as to raise and lower the melt temperature. Changing the melt temperature changes the viscosity, which in turn changes the pressure. When the pressure is back at its former value, it will indicate that the viscosity is also. In other words, by causing the melt temperature to change in an appropriate direction the cascade loop will have restored the viscosity to its former value as well.

Another embodiment that can be used to control viscosity changes the melt temperature by controlling the speed of the screw. As has already been noted, most of the heat put into the plastic comes from the screw rather than the temperature controllers, so melt temperature is very sensitive to screw speed. Note that, with the system described here, the screw speed may be changed without directly affecting die pressure because a gear pump is used between the extruder screw and the die. It is a characteristic of the gear pump that, as long as there is sufficient pressure at the input to keep the teeth full, the throughput is relatively insensitive to changes in pressure at the inlet of the pump. It is almost entirely dependent on the RPM of the pump, and what little changes in throughput may be observed as a result of changes in differential pressure across the pump can be readily compensated by slight revisions in pump speed. In this embodiment, the melt temperature cascade loop from a melt temperature sensor back to the barrel zone controllers is not used. Instead, if the die pressure drops, for example, indicating a decrease in viscosity, the screw speed is caused to be reduced. This will cause less work to be done on the plastic and less heat to be transferred from the screw to the plastic. The melt temperature will drop, thus increasing the viscosity.

The preferred method of controlling a gear pump, as already described in the aforementioned U.S. Pat. No. 4,209,476, is to control the screw so as to maintain the differential pressure across the pump constant. If this method is used and screw speed is altered to vary viscosity according to this invention, the screw speed is not changed directly by the die pressure. Rather, it is changed by changing the setpoint of the differential pressure controller in such a way that that controller calls for the desired change in screw speed. In other words, the melt pressure controller is used in a cascade fashion to control the differential pressure loop. As noted, the change in differential pressure will result in a slight change in throughput, which will have an effect on accuracy. This effect is not great, and it can be compensated for if a microprocessor controller is used for the viscosity controller, for example by use of a look-up table to change the gear pump speed accordingly.

The above and further objects and advantages of the invention will be better understood with reference to the following detailed description of preferred embodiments, taken in combination with the accompanying drawings.

DETAILED DESCRIPTION

Figure 1:
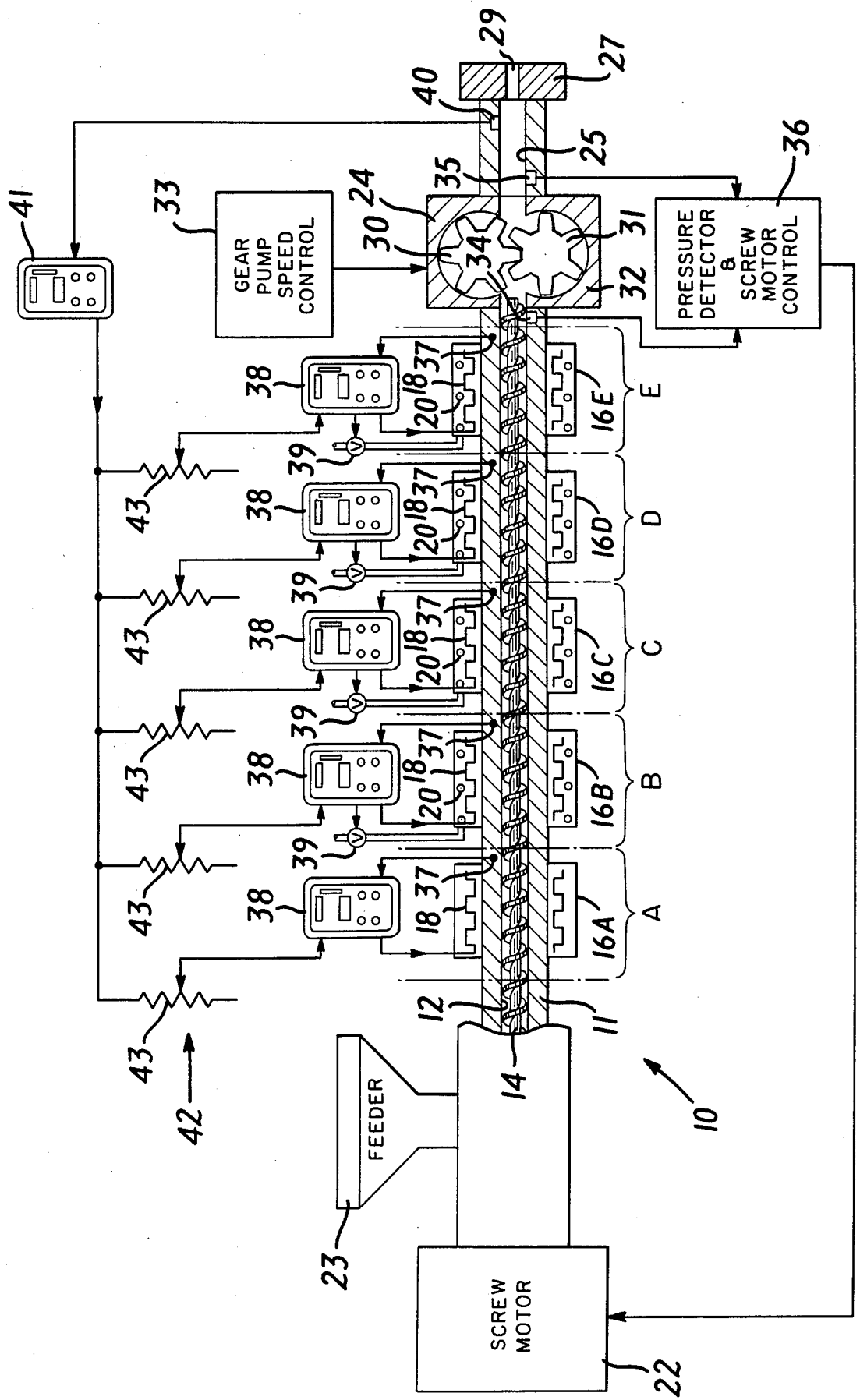
FIG. 1 is a diagrammatic illustration, partly in section, of an extruder and control system according to the invention and shows a melt pressure controller in cascade relation with individual temperature controllers.

Referring now to FIG. 1, a plastics extruder 10 includes a metal barrel having a bore 12 in which is situated a rotatable screw 14. The barrel is divided into five temperature control zones, A through E. Each zone of the barrel has a temperature altering jacket or heater, 16A through 16E, clamped to the outside of the barrel in the zone in heat exchange relation with the barrel. The jacket 16A includes only heating elements 18, such as Calrod heaters, while jackets 16B through 16E include both heating elements 18 and cooling coils 20 for circulating an appropriate coolant.

During operation, a thermoplastic stock material in pellet or powder form is introduced into the left end of the bore 12 from a feeder 23. The screw 14 is rotated by an electric motor 22 to move the plastic stock to the right in the bore in FIG. 1. The plastic in the bore is heated by the heating elements 18 in the jackets 16A through 16E or by frictional heating resulting from the motion of the plastic or both. Frictional heating can raise the plastic temperature too high and for this reason the cooling coils 20 are provided in the jackets 16B to 16E. The plastic in the bore is melted, mixed, and transported to the right end of the bore where it has become a flow of molten plastic material or "melt". The flow of plastic material at the barrel end is metered by a gear pump 24, which pump operates at a fixed speed to deliver a constant volumetric rate of flow. The metered flow of molten plastic material from the right side of the gear pump is forced through a passage 25 to an extrusion die 27. The die 27 has a fixed orifice 29 of a predetermined shape. When a continuous extruded article of constant cross-section is made, e.g. garden hose, weather stripping, or the like, the die 27 determines the cross-sectional shape and dimensions.

The gear pump 24 comprises generally a pair of closely meshed, counter revolving gears 30 and 31 enclosed in a close fitting housing 32. For each rotation of the gears, a known volume of fluid is transmitted through the pump. The volume of transmitted fluid is independent of the pressure at the inlet of the pump so long as a differential pressure is maintained across the pump, and as long as enough pressure exists at the inlet to the pump to keep the pump chambers filled. The gear pump 24 is driven by an electric motor (not shown) whose speed is regulated by a gear pump speed control 33. Operated with a controlled pressure differential across it, the pump is a constant volume pump, its volumetric pumping rate is dependent only on the speed of the pump, and it is independent of the viscosity of the fluid. Therefore, a selected volumetric flow rate of molten plastic material to the extrusion die 27 is maintained by operating the gear pump at an appropriate constant speed.

To prevent the gear pump from being undersupplied or oversupplied with the plastic melt from the barrel, sensors 34 and 35 detect pressure at the inlet and outlet of the pump, respectively, and a pressure detector and screw motor speed control circuit 36 controls the rate at which the motor 22 rotates barrel screw 14 Increasing the rate at which the barrel screw rotates increases the supply rate of plastic to the pump 24 and reducing the screw rotation rate reduces the supply rate to the pump. When the differential pressure from the sensor 34 to the sensor 35 drops below a predetermined value, the pressure detector and screw motor control 36 senses a "starving" condition and increases the screw rotation rate to restore the differential pressure to the predetermined value. Likewise, when the differential pressure between sensors 34 and 35 becomes higher than the predetermined value, the pressure detector and screw motor control circuit 36 senses an oversupply and decreases the screw rotation rate. A predetermined differential pressure is thus maintained across the gear pump 24. The operation of the gear pump and its associated components is explained in greater detail in the aforementioned U.S. Pat. No. 4,209,476, which is incorporated herein by reference.

Each of the temperature control zones A-E includes a temperature sensor 37, such as a thermocouple typically used to detect temperature near the bore 12. These provide an analog indication of the sensed temperature. Each sensor 37 provides its indication of temperature to an associated controller 38. The controllers 38 may be commercially available process controllers, such as those in a Harrel MC-201-DD Variable Profile Melt System. Each controller includes means for adjusting a setpoint therein, representing the desired temperature in that zone, which is to be compared with a temperature indication received by the controller from its associated temperature sensor 37. The controllers 38 may operate in the proportional, integral, differential (PID) mode known in the art.

Each controller 38, then, compares the temperature indication of a sensor 37 in its zone with its setpoint, and provides a time proportioned control signal to the temperature altering jacket, 16A-16E, of the zone. The time proportioned control signal is ordinarily a pulse signal having a pulse width or duration that is a function of the difference between the sensed temperature indication and its corresponding setpoint. If the sensed temperature indication is remaining below the setpoint, the control signal energizes the heating elements 18 in the heating jacket of the zone. Although for purposes of illustration, the controllers 38 are shown coupled directly to the heating elements 18, energization may be effected through a contactor (not shown), connected between the heating element and a supply and controlled by the controller output. In the case of zones B through E, if the temperature indication for the zone is residing above its corresponding setpoint, the control signal from a controller 38 activates a solenoid valve 39 to circulate a coolant through the cooling coils 20 of the jacket in its zone.

As explained above, the gear pump 24 provides a flow of melt to the extrusion die 27 at a constant volumetric rate. The melt is forced out of the fixed orifice 29 of the die by the pressure of the plastic material in the conduit. Under these conditions, the viscosity of the plastic material in the passage 25 can be characterized as varying in a known manner with the pressure in the passage. Since the pressure in the passage is readily measured by means of a conventional pressure sensor 40, communicating with the passage, the combination of the gear pump 24, the extrusion die orifice 29, and the pressure sensor 40 serve as an effective viscosity meter. Since the viscosity of the plastic material in the conduit can be altered by varying the melt temperature, a control loop may now be formed to control the melt viscosity by sensing the melt pressure and controlling the melt temperature to maintain a selected melt pressure and hence a selected viscosity.

A conventional, commercial melt pressure sensor, such as the Harrel PS-300 flush diaphram type pressure gauge, provides an analog electrical representation of the sensed pressure. A controller 41 receives the pressure indication of the pressure sensor 40 and compares it with a predetermined pressure setpoint. Depending on that comparison, the controller 41 may raise or lower the amount of heating in the barrel by appropriately modifying the setpoints of each controller 38. Theoretically, at least, the heating of the barrel may be modified by alteration of the sensed temperature indications that are compared with the setpoints, although ordinarily in cascade controls such as melt temperature cascade, it is the setpoint that is revised. Here, the controller setpoints are modified through a current divider network 42 that provides a separate adjustable resistance 43 for each controller 38. This permits a different modification of setpoint for each zone, and the preselected longitudinal heat profile for the barrel is maintained. Thus, the melt viscosity is maintained at a selected value by means of a cascade melt pressure control loop which is compatible with a known system for individually controlling the temperatures of the various zones of the barrel.

Figure 2:
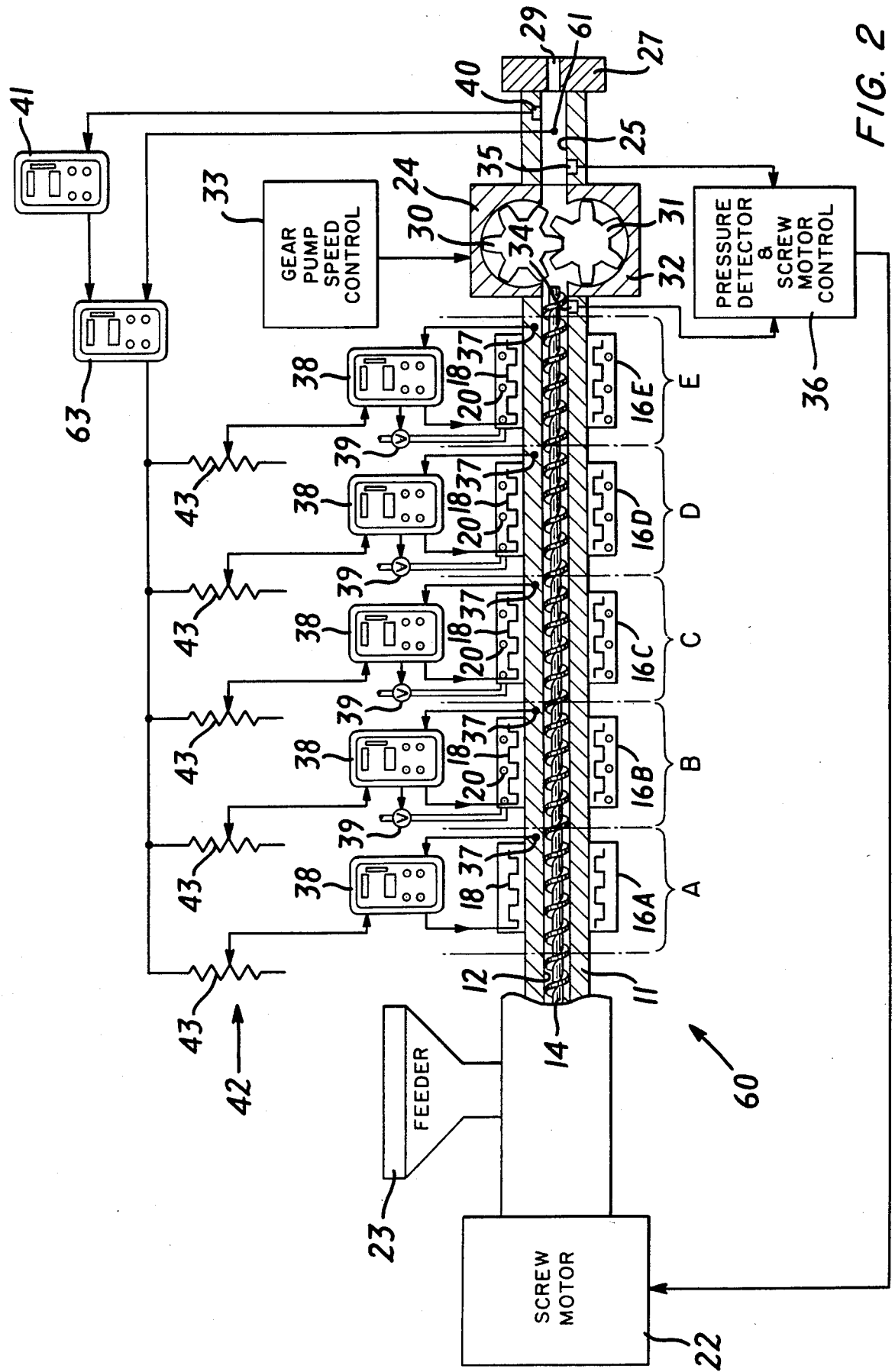
FIG. 2 is a diagrammatic illustration, partly in section, of an extruder and control system according to a further embodiment of the invention, wherein the melt pressure controller is connected to control the setpoint of the melt temperature controller in a melt temperature cascade loop.

Turning now to FIG. 2, there is shown an extruder 60, wherein according to another embodiment of the present invention, viscosity responsive control is employed with a conventional melt temperature cascade control system. Reference numerals used in FIG. 1 are again used in FIG. 2 to denote like elements or components. In addition to a temperature control system for the barrel, the extruder 60 includes a melt temperature control loop comprising a melt temperature sensor 61 located in the passage 25 to provide an indication of the melt temperature and a controller 63 that receives the melt temperature indication from the sensor 61 and compares it to a melt temperature setpoint set therein. Depending on the comparison, the melt controller 63 may raise or lower the amount of heating inthe barrel zones A-E, as is conventional for bringing the melt temperature to the setpoint of the controller 63. In the prior art, melt temperature cascade control loops of the type illustrated are commonly used for maintaining the melt temperature at a constant level. However, the extruder of FIG. 2 further includes a melt viscosity control loop comprising the pressure sensor 40 for providing an indication of the melt pressure. Controller 41 receives the melt pressure indication provided by the sensor 40 and compares it to a predetermined pressure setpoint. The pressure responsive controller 41 output is connected to the melt temperature responsive controller 63 to control the setpoint thereof. Depending on the comparison of actual, sensed pressure and pressure setpoint by the controller 41, the controller 41 may raise or lower the melt temperature setpoint of the melt temperature controller 63 to bring the melt pressure to the pressure setpoint by modifying the melt temperature. Thus, the melt viscosity is maintained at a selected value by means of a cascade melt pressure control loop which is compatible with a known melt temperature control system.

Figure 3:
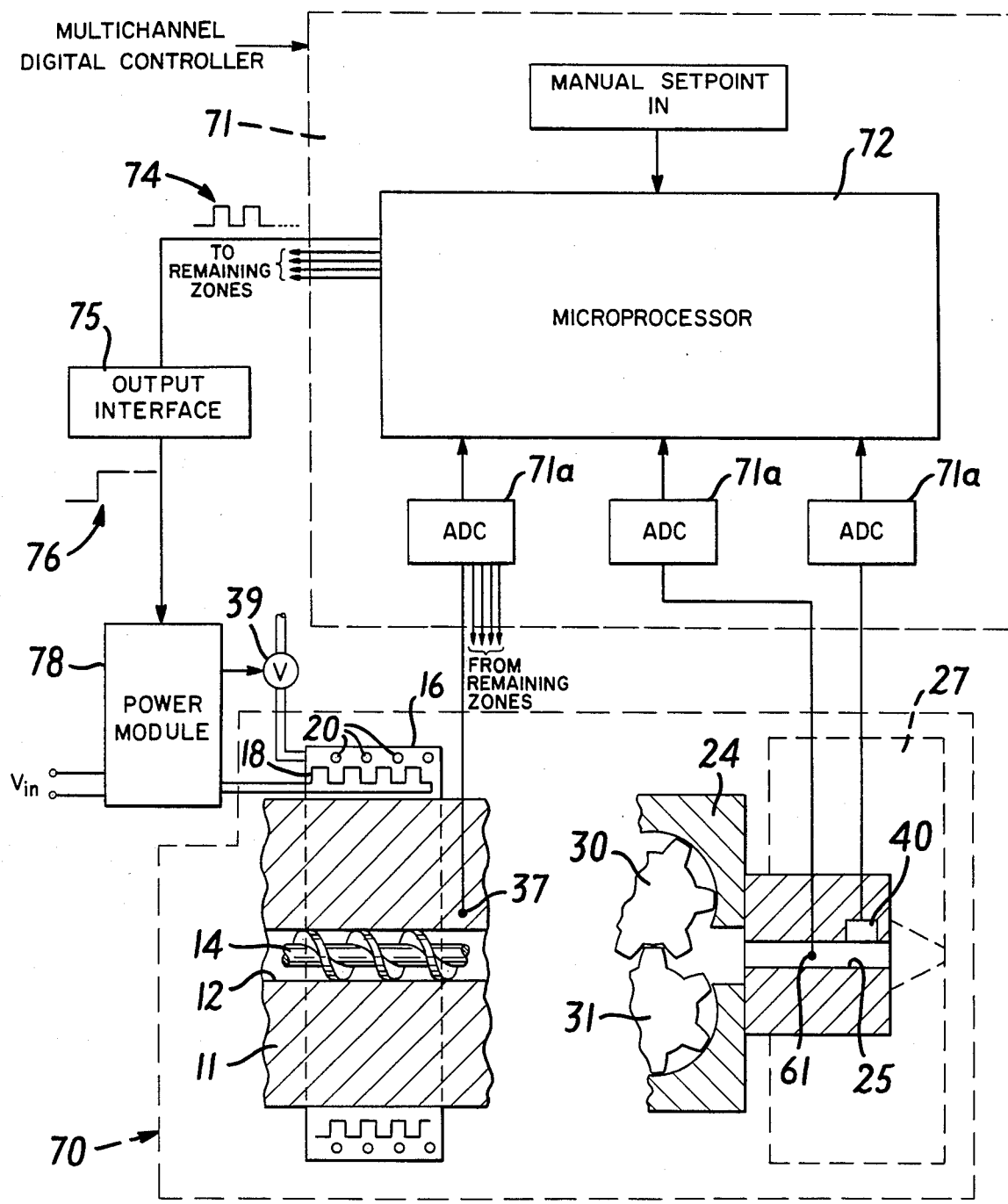
FIG. 3 is another diagrammatic illustration of an embodiment of the invention, with the extruder shown in fragmentary section, and illustrating a microprocessor controller to accomplish viscosity control.

Each of the preceding control arrangements, accomplished through a system of discrete controllers, can be accomplished as well by a microprocessor based controller, currently available, wherein setpoints are retained in memory and regularly compared to digitized temperature and pressure indications from sensors of the kind described above. Differences between barrel zone temperature indications and stored setpoints are used to calculate appropriate energizations of the heating and cooling provisions of the jackets 16A to 16E pursuant to algorithms conventionally provided by the programming of the controller. Typically such algorithms include the known PID control mode previously discussed. Referring to FIG. 3, an extruder 70, controlled according to the invention, employs a multichannel digital controller 71. Reference numerals used in FIG. 1 and 2 are again used in FIG. 3 to denote like elements or components. For simplicity of illustration, only the control system, one zone of the barrel 11, the gear pump 24, the passage 25, and the die 27 of the extruder are depicted. Analog temperature indications of the sensors 37, and of the melt temperature sensor 61, as well as the analog pressure indication of the melt pressure sensor 40 are converted to digital representations by one or more analog-to-digital converters 71A and supplied to a microprocessor 72 which includes a memory. Digital representations of the temperature setpoints for each zone, the melt temperature setpoint and the pressure setpoint for the melt pressure are all stored in the microprocessor memory. The microprocessor is programmed to perform essentially all of the control functions of the discrete controllers of FIG. 2. These functions include comparing the digitized melt pressure indication with the melt pressure setpoint in the memory and, depending on that comparison, appropriately modifying the melt temperature setpoint in the memory, comparing the digitized melt temperature indication with the melt temperature setpoint in the memory and, depending on that comparison, appropriately modifying the temperature setpoints of each zone in the memory, comparing the digitized temperature indication for each zone with the corresponding setpoint for the zone in the memory and, depending on that comparison, providing an output signal 74 for each zone. The output signal is formulated pursuant to the chosen control algorithm, for example, the typical, known PID equation used to formulate the output control signal for a particular departure of sensed temperature from temperature setpoint. The output signal 74 for each zone is supplied to a respective output interface circuit 75, which provides a time proportioned control signal 76 having a pulse width or duration that is representative of the prescribed output to correct or maintain the zone temperature. The time proportioned control signal 76 is supplied to a power module 78, which energizes the heating elements 18 or the solenoid activated valve 39 that controls the flow of coolant in the cooling coils in the temperature altering jacket of the zone.

Although the combination of steps in the abovedescribed process, whereby melt pressure indicative of viscosity serves to modify a temperature setpoint, is believed to be novel, programming the microprocessor based controllers to carry out each of the steps of the above-described control process is known or easily accomplished by those skilled in the art of microprocessor programming including the development of a PID control output based upon the comparison of an input and a stored setpoint. The programming, therefore, need not be further described. The multichannel digital controller 71 may be a commercially available unit, such as the Harrel CP-660 Digipanel Control System. The output interface 75 is ordinarily included in commercially available controllers, such as the aforementioned CP-660. The power module 78 may be a commercially available module containing mechanical or solid state relays which are capable of being activated by the time proportioned control signals from the output interface and capable of switching current to the heating element or solenoid actuated valve.

FIG. 3 is representative of microprocessor implementation of the system of FIG. 2. It should be noted that the control loops of the extruder control of FIG. 1 may likewise be implemented with a multichannel digital controller in the manner described above.

In extruder control systems using deep and shallow temperature sensors connected in cascade relationship in individual temperature control zones as in the inventor's U.S. Pat. No. 4,272,466, incorporated herein by reference, the invention may be practiced by providing a gear pump as described above and by using the correction signal developed by the comparison of the sensed pressure and pressure setpoint to revise the setpoints associated with the deep sensors or, where a melt temperature cascade loop modifies that setpoint, by using the pressure correction signal to revise the melt temperature setpoint.

Figure 4:
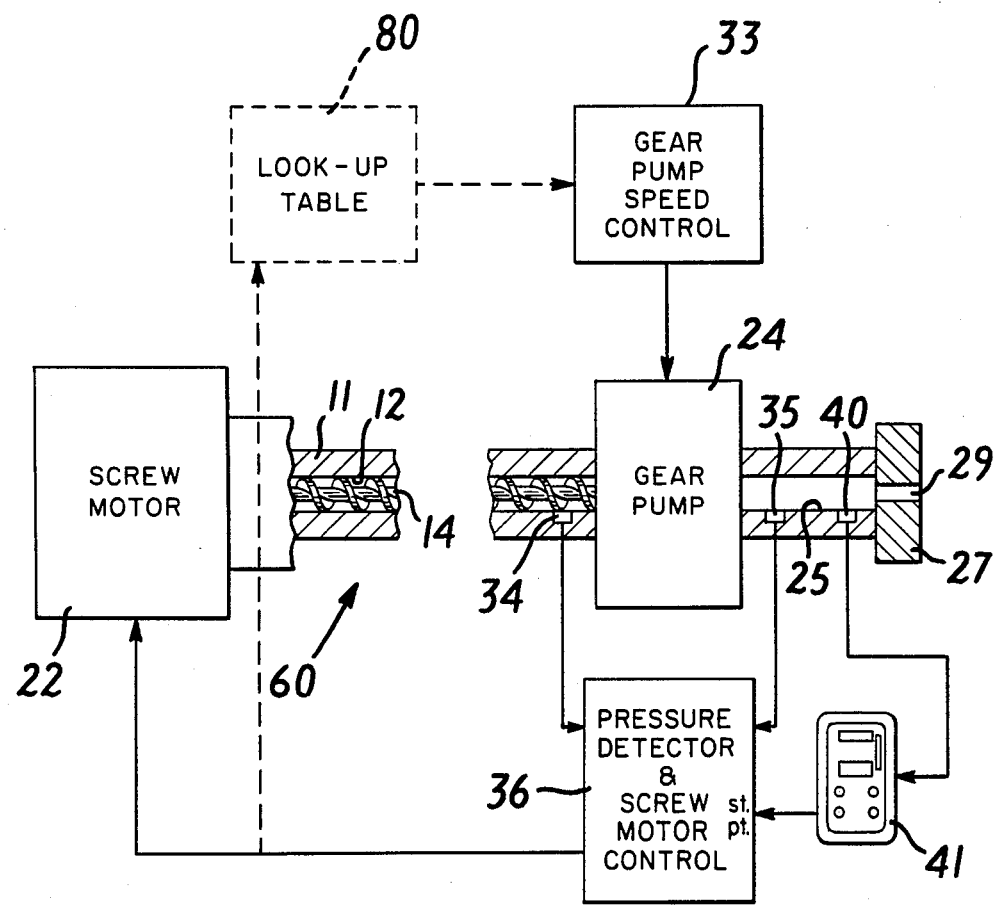
FIG. 4 is a further diagrammatic illustration with the extruder in fragmentary section and shows an embodiment in which screw speed is varied to control temperature and, thus, viscosity.

In FIG. 4, an embodiment of the invention is shown wherein control of screw speed is employed to control the heat imparted to the plastic in the extruder bore, thereby to control viscosity. Again, similar numerals are applied to similar parts. As in previous embodiments, a pressure sensor 40 detects pressure at the die 27. A pressure responsive controller 41 is connected to the sensor 40. Again the pressure detector and screw motor control 36 responds to differential pressure across the gear pump 24 as measured at the pressure sensors 34 and 35. The pressure detector and screw motor control 36 once more compares the differential pressure to the desired differential pressure or differential pressure setpoint and controls the screw motor 22 accordingly. In this case, however, the pressure differential sought, e.g. the setpoint of the pressure detector and screw motor control 36, is controlled by the pressure responsive controller 41.

If, for example, pressure higher than a setpoint of the controller 41 is detected at the pressure responsive controller 41, this controller raises the setpoint of the pressure detector and screw motor control 36. The motor speed control output from the detector and motor control 36 to the screw motor 22 is thus increased to provide higher screw speed to impart increased heat to the plastic in the bore 12. The increase in temperature returns the viscosity of the melt proximate the die to its desired level, reducing the pressure sensed at the sensor 40 and moving the sensed pressure towards the setpoint of the controller 41. The output of the controller 41 is adjusted pursuant to the control algorithm of that controller to revise the setpoint of the pressure detector and screw motor control 36. Likewise, low viscosity indicated by lower than setpoint pressure at the sensor 40 results in adjustment of the setpoint of the pressure detector and screw motor control 36 to reduce screw speed and contributed heat, raising viscosity. Although, nominally, throughput of gear pump should remain the same, it will be recognized that the pressure detector and screw motor controller 36 is no longer controlling the screw motor based only on the optimum pressure differential across the pump 24. Minor variations in throughput may be encountered, in which case the gear pump speed may be varied slightly in compensation. This is particularly easily accomplished in a microprocessor controller like that depicted in FIG. 3 by providing a gear pump speed control output from the microprocessor to the speed control 33 that varies slightly with screw speed. In FIG. 4 this is indicated, in broken lines, by a look-up table 82, connected between the output of the pressure detector and screw motor control 36 and an input to the gear pump speed control 33.

The above-described embodiments of the invention are exemplary. It will be understood that various modifications and alterations may be made to those embodiments without departing from the spirit and scope of the invention as defined in the appended claims. For example, the pressure detector and screw motor control 36 associated with the gear pump and the viscosity control may share a single pressure sensor in the passage to the die, or in certain embodiments it may be sufficient to include a single pressure sensor at the inlet of the gear pump for the purpose of keeping the gear pump adequately supplied. The gear pump speed control 33 and screw motor control 36 may be incorporated in the same multichannel digital controller containing the other process control loops of the extruder.

I claim:

1. A method of extruder viscosity control for an extruder used in the manufacture of continuously extruded articles including the steps of providing a controlled volumetric flow of thermoplastic material to be extruded to a die by provision of a controlled volumetric flow means upstream of the die with respect to the flow of the material to be extruded, detecting pressure variations in the flowing material intermediate the controlled volumetric flow means and the die, and altering the temperature of the material flowing to the die to be extruded to hold the pressure relatively constant, whereby the viscosity of the material to be extruded is held substantially constant at the die.

2. The method of extruder viscosity control according to claim 1 further comprising the step of delivering the material to be extruded to the controlled volumetric flow means and die by rotation of an extruder screw in a bore of an extruder barrel and wherein the step of altering the temperature of the material to be extruded includes altering the speed of the extruder screw.

3. The method of extruder viscosity control according to claim 1 further comprising the steps of detecting the temperature of the material to be extruded at a location proximate the die, comparing an indication of the detected temperature to an indication of a preselected temperature, and controlling heat in the extruder based on that comparison, the step of altering the temperature to hold the pressure relatively constant including revising at least one of the detected temperature and the preselected temperature indication.

4. The method of extruder viscosity control according to claim 1, further including the steps of storing a predetermined temperature setpoint for material at a location in a barrel of the extruder upstream of the controlled volumetric flow means, sensing the material temperature upstream at the location, comparing an indication of the sensed upstream temperature and the stored setpoint, and providing heat exchange with the extruder barrel based on the sensed temperature indication and setpoint comparison, the step of altering the temperature including revising at least one of the stored temperature setpoint and the sensed temperature indication to alter the comparison thereof.

5. The method of extruder viscosity control according to claim 4 further comprising the steps of detecting the temperature of the material to be extruded at a location proximate the die, comparing an indication of the detected temperature proximate the die to an indication of a preselected temperature, and controlling heat in the extruder based on that comparison, the step of altering the temperature to hold the pressure relatively constant including revising at least one of the indication of detected temperature proximate the die and the indication of preselected temperature, and the step of revising at least one of the stored temperature setpoint and the sensed temperature indication for the upstream location including developing a correction signal based on the comparison of the indications of detected temperature and preselected temperature proximate the die, as revised, and applying the correction signal to at least one of the stored temperature setpoint and sensed temperature indication for the upstream location.

6. The method of extruder viscosity control according to claim 1 wherein the step of providing a controlled volumetric flow includes providing a gear pump as the controlled volumetric flow means and controlling the speed thereof to control the volumetric flow.

7. An extruder control system for use on an extruder for the production of continuously extruded articles and having a barrel, a screw within the barrel to move towards a die material in the barrel from which extruded articles are formed, means for delivering a constant volumetric flow of the material to the die, and means in heat exchange relation with the barrel for regulating the temperature of the material moving in the barrel towards the die;

the control system including controller means for electrically controlling the means in heat exchange relation with the barrel to establish a predetermined temperature of the material in the barrel; and means responsive to an electrical input thereto indicative of viscosity of the material in the flow path proximate and preceding the die for electrically revising the predetermined temperature, in response to a change in said viscosity.

8. An extruder control system according to claim 7, wherein the means responsive to an electrical input indicative of viscosity comprises means responsive to an electrical indication of pressure in the material in the flow path proximate the die, and means for developing an electrical correction signal operative to revise the predetermined temperature established by the controller means to reestablish the viscosity.

9. An extruder control system according to claim 8, wherein the means for developing an electrical correction signal operative to revise the predetermined temperature includes means responsive to an electrical input indicative of temperature of the material in the barrel proximate the die and operatively connected to revise the predetermined temperature in response to the temperature of the material proximate the die, said means responsive to an electrical indication of pressure providing a correction signal to said means responsive to an electrical input indicative of temperature to revise the electrical correction signal thereof based on detected pressure proximate the die.

10. An extruder control system according to claim 7, wherein the controller means comprises means for storing at least one setpoint representing said predetermined temperature, input means for receiving at least one electrical temperature indication from a temperature zone served by said means in heat exchange relation, and said means responsive to an electrical input indicative of viscosity for electrically revising the predetermined temperature comprises means for altering at least one of said setpoint and said temperature indication as a function of pressure of the material between said means for delivering a constant volumetric flow and the die.

11. An extruder control system according to claim 10, wherein the means for storing at least one setpoint includes a memory, said controller means includes means for digitally representing the at least one electrical temperature indication from a zone served by said means in heat exchange relation, and means for producing a control output based on the setpoint stored in memory and the barrel zone temperature indication, said means for altering at least one of said setpoint and said temperature indication comprising means for altering the setpoint to modify the control output and thereby to modify the temperature of the material in the barrel towards the revised setpoint temperature and to alter the viscosity of the material proximate the die.

12. An extruder control system according to claim 8, wherein the means responsive to an electrical input indicative of viscosity comprises means for storing a predetermined pressure setpoint, and said means for developing an electrical correction signal operative to revise the predetermined temperature comprises means for comparing the stored pressure setpoint and the electrical indication of pressure and deriving the correction signal as a function of that comparison.

13. The extruder control system according to claim 7 wherein the means for delivering a constant volumetric flow of the material to the die comprises a gear pump.

14. An extruder for continuous production of extruded articles of thermoplastic material including feed means for introducing material to be extruded, a barrel defining a bore, a screw for moving the material in the bore, a screw drive, a series of temperature altering means in heat exchange relation to the barrel to establish the temperature of the material in the bore, means downstream of the screw and communicating with the bore for delivering a constant volumetric flow of the material from the bore, a die, a passage in material delivery communication between the constant flow means and the die, sensing means responsive to a viscosity representative characteristic of the material in the passage, electrical control means having temperature sensors in zones along the barrel at which are located the means in heat exchange relation to the barrel, means for comparing the temperatures sensed by said temperature sensors with at least one preselected temperature to develop signals controlling said means in heat exchange relation with the barrel, and viscosity correcting means connected with said sensing means responsive to a viscosity representative characteristic and connected in controlling relation to at least one of said screw drive and said means for comparing the temperatures to correct viscosity in the passage leading to the die by alteration of heat imparted to the material in the barrel.

15. An extruder according to claim 14, wherein said sensing means responsive to a viscosity representative characteristic is a pressure sensor in communication with said passage.

16. An extruder according to claim 15 wherein the viscosity correcting means is connected with said screw drive and provides a screw drive speed adjusting output to adjust the heat imparted by the screw to material in the barrel to control viscosity.

17. An extruder according to claim 15 wherein the viscosity correcting means is connected with said means for comparing the temperatures to alter the heat exchange between the barrel and the means in heat exchange relation thereto to thereby alter the temperature of the material in the barrel to control viscosity.

18. An extruder according to claim 17, wherein said viscosity correcting means comprises means for storing a preselected pressure indication, and means responsive to the stored pressure indication and the pressure sensed by the pressure sensor for developing a temperature correction signal.

19. An extruder according to claim 18, wherein said electrical control means comprises means for storing the at least one preselected temperature as at least one setpoint, and the viscosity correcting means is connected to revise the stored temperature setpoint as a function of detected viscosity errors indicated by deviation of the sensed pressure from the stored preselected pressure indication.

20. An extruder according to claim 18, further comprising a melt temperature control means having a temperature sensor located to detect melt temperature in the passage communicating from the constant volumetric flow means to the die, means for storing a preselected melt temperature, means for comparing the sensed melt temperature and the preselected melt temperature to develop a melt temperature error signal when the sensed and stored melt temperatures differ, means applying a correction signal as a function of the melt temperature error signal to the electrical control means to modify the signal to the electrical control means and to thereby modify the signals controlling said means in heat exchange relation with the barrel, and said viscosity correcting means being connected to said melt temperature control means to alter the correction signal from the melt temperature control means.

21. An extruder according to claim 20, wherein said melt temperature control means comprises means for storing the preselected melt temperature as a melt temperature setpoint, said viscosity correcting means being connected to the means for storing the preselected melt temperature to altar said melt temperature setpoint, thereby to vary the melt temperature error signal, the resulting correction signal, and the signals controlling the means in heat exchange relation to the barrel.

22. An extruder according to claim 19, wherein the electrical control means having temperature sensors in zones, the means for comparing the temperatures sensed, and the viscosity correcting means comprise a digital controller, the controller including at least one memory storing each of the setpoints representative of preselected temperatures for several temperature control zones along said barrel and the preselected pressure for the passage, the controller having control outputs for controlling the means in heat exchange relation to the barrel, means for comparing each setpoint with a corresponding measured value for the corresponding zone and developing a correction signal based on a predetermined algorithm, and means for altering at least one temperature setpoint based on the correction signal developed from the comparison of the pressure setpoint and the sensed pressure.

23. An extruder viscosity control system for use on an extruder for production of continuous articles of thermoplastic material having a barrel, a screw within the barrel to move material in the barrel towards a die, means for controlling the volumetric flow of material to the die, and means in heat exchange relation with the barrel for regulating the temperature of the material moving in the barrel towards the die;

the control system including means responsive to an indication of the pressure of the material between the volumetric flow control means and the die for producing a temperature alteration output; and said temperature alteration output of the pressur indication responsive means being connected in controlling relation to at least one of a screw drive speed control and the means in heat exchange relation with the barrel.

24. An extruder control system according to claim 23, wherein the screw drive speed control comprises a variable speed screw drive motor and motor control circuitry for controlling the speed thereof, said temperature alteration output of the pressure indication responsive means being connected with the motor control circuitry to vary screw speed and thereby vary the heat imparted by the screw to the material in the barrel to vary the material viscosity.

25. An extruder control system according to claim 24, wherein the means for controlling the volumetric flow is a gear pump, wherein the motor control circuitry for controlling the speed of the screw drive motor includes pressure differential responsive means connected with pressure sensors located before and after the gear pump in the direction of the flow of material in the extruder and comprising means to vary an output supplied therefrom in controlling relation to the screw drive motor, said pressure indication responsive means including a control means connected with a pressure sensor located to sense pressure in the material being extruded after the gear pump and before the die in the direction of the movement of the material in the extruder, and said pressure indication responsive means also being connected to the means to vary an output for adjusting that output in dependence upon the pressure after the gear pump, whereby motor speed is controlled as a function of viscosity of the material after the gear pump and before the die to control heat applied by the screw to the material in the extruder.

26. An extruder control system according to claim 25 further comprising means for controlling gear pump speed as a function of the speed at which screw motor is driven.

* * * * *